United States Patent [19]

Yasui et al.

[11] Patent Number: 5,403,098
[45] Date of Patent: Apr. 4, 1995

[54] HYDRODYNAMIC BEARING DEVICE

[75] Inventors: Hiroyoshi Yasui, Nara; Masayoshi Onishi, Tondabayashi, both of Japan

[73] Assignee: Koyo Seiko Co., Ltd., Osaka, Japan

[21] Appl. No.: 121,523

[22] Filed: Sep. 16, 1993

[30] Foreign Application Priority Data

Sep. 18, 1992 [JP] Japan .................. 4-071443 U

[51] Int. Cl.[6] .............................. F16C 32/06
[52] U.S. Cl. .................... 384/115; 384/119; 384/132
[58] Field of Search ........ 384/100, 114, 115, 118–120, 384/130, 132, 144, 292

[56] References Cited

U.S. PATENT DOCUMENTS

| 3,640,590 | 2/1972 | Beisemann . | |
| 4,254,961 | 3/1981 | Fersht et al. | 384/100 X |
| 4,883,367 | 11/1989 | Maruyama | 384/114 |

FOREIGN PATENT DOCUMENTS

| 167111 | 7/1988 | Japan | 384/100 |
| 1-224517 | 9/1989 | Japan . | |
| 234910 | 10/1991 | Japan | 384/115 |
| 141411 | 6/1993 | Japan | 384/115 |

Primary Examiner—Thomas R. Hannon
Attorney, Agent, or Firm—Popham, Haik, Schnobrich & Kaufman, LTD.

[57] ABSTRACT

A hydrodynamic bearing device incorporates a relatively rotatable shaft 1 and a sleeve 2 internally sealed with the shaft 1. A groove for generating dynamic pressure is formed on an external circumferential surface of the shaft 1 or on internal circumferential surface of the sleeve 2. A circumferential groove 1a is formed at one end of the shaft 1 external to the bearing. An annular sealing plate 3 is secured to the sleeve 2 and interegagging with the shaft 1 external to the bearing and the circumferential groove 1a. A labyrinth is formed between the inner-diametric domain of the sealing plate 3. An annular recessed domain 2c is defined by internal circumferential surface of the sleeve 2 and the sealing plate 3 at a position substantially opposite the circumferential groove 1a. An oil-pooling space 4 thereby formed by the shaft 1, the circumferential groove 1a, the sleeve 2, the sealing plate 3, and the annular recessed domain 2c.

2 Claims, 2 Drawing Sheets

HYDRODYNAMIC BEARING DEVICE

BACKGROUND OF THE INVENTION

1. Field of the Invention

The present invention relates to a hydrodynamic bearing device which relatively and rotatably supports a load with lubricant interposed between a sleeve and a shaft. The shaft is coaxially disposed with the same sleeve, and has a minimal clearance with the sleeve. More particularly, the invention relates to a hydrodynamic bearing device for securely preventing internal lubricant disposed between the sleeve and the shaft from flowing out of the bearing unit. The invention also prevents foreign matter from infiltrating into the bearing unit.

2. Description of the Prior Art

Normally, any of those conventional bearings provided for fast-rotating component parts of electric equipment or electronic office apparatuses uses a hydrodynamic bearing (a slide bearing) which causes a sleeve and a shaft to rotate relative to each other in order to generate dynamic pressure through the pumping of lubricant interposed between the sleeve and the shaft. Conventionally, there are a variety of sealing means for a hydrodynamic bearing device such as the one using magnetic fluid or the one shown in FIG. 5. The sealing means shown in FIG. 5 has a pair of grooves 52a and 52b in a sleeve 52 (or grooves may be formed on the part of a shaft 51) in order to form labyrinth between the sleeve 52 and the shaft 51. Another sealing means shown in FIG. 6 has a pair of projections 62a and 62b on the sleeve 62 that engage with corresponding grooves 61a and 61b formed on the shaft 61 to also form a labyrinth. As is described in the Japanese Patent Application Laid-Open Publication No. HEI-1-224517 of 1989, another type of sealing means has a secondary land across groove having a predetermined width outside of axial direction of a herringbone-type hydrodynamic groove formed between the sleeve and the groove thereof.

As described above, a variety of techniques have been devised to prevent lubricant between the sleeve and the shaft of a hydrodynamic bearing device from leaking out or foreign matter from infiltrating into the bearing. However, a sealing effect cannot fully be achieved in conventional labyrinth-incorporating hydrodynamic bearing devices such as that shown in FIG. 5. Further, such conventional seal that use magnetic fluid incur cost disadvantage. On the other hand, the labyrinth-incorporating hydrodynamic bearing device shown in FIG. 6 involves the use of a relatively complex structure. In many cases, conventional hydrodynamic bearing devices operate vertically erected. However, such conventional hydrodynamic bearing devices cannot always maintain their vertical posture. Instead, they progressively decline during use gradually changing their positions. Once the devices are declined, lubricant stored in the bearing unit is apt to leak of the bearing shaft, bearing, thus causing critical problems.

SUMMARY OF THE INVENTION

Therefore, the invention has been achieved to solve those problems described above. The object of the invention is to provide an improved hydrodynamic bearing device that is capable of securely preventing internal lubricant from leaking out even when the hydrodynamic bearing device declines, and that prevent foreign matter from infiltrating into the bearing unit. In addition, the hydrodynamic bearing device of the invention can be manufactured inexpensively.

More particularly, the invention provides an improved hydrodynamic bearing device comprising a relatively rotatable shaft and a sleeve accommodating the shaft therein. The sleeve generates hydrodynamic pressure either on its external circumferential surface or its internal circumferential surface. A circumferential groove is formed at one end of the shaft outside of the bearing. An annular sealing plate is secured to the sleeve and inter-engages with the shaft outside of the bearing relative to the circumferential grooves. A labyrinth is thereby formed between the inner diametric domain of the sealing plate and the shaft. Further, an annular recessed domain is defined inside of the bearing by the sealing plate and the internal circumferential surface of the sleeve at a position substantially opposite the circumferential groove. An oil-pooling space is thereby formed by means of the shaft, the circumferential groove, the sleeve, the sealing plate, and the annular recessed domain.

According to the structure of the improved hydrodynamic bearing device offered by the invention, even when the whole of the bearing body declines causing internal lubricant to begin leaking out of the bearing, the lubricant can be securely held in the oil pooling space without leaking out. Furthermore, the improved hydrodynamic bearing device of the invention can easily be machined and assembled.

BRIEF DESCRIPTION OF THE DRAWINGS

The object and features of the invention will more fully be made clear from the following detailed description and the accompanying drawings which are solely given by way of illustration, and thus not being limitative of the invention, wherein;

FIGS. 2A and 2B show a cross-sectional view of the hydrodynamic bearing device according to a second embodiment of the invention, wherein FIG. 2A is a cross-sectional view of the same, and FIG. 2B illustrates the state in which lubricant flows into the circumferential groove without leaking out;

DETAILED DESCRIPTION OF THE PREFERRED EMBODIMENTS

Figure 1:
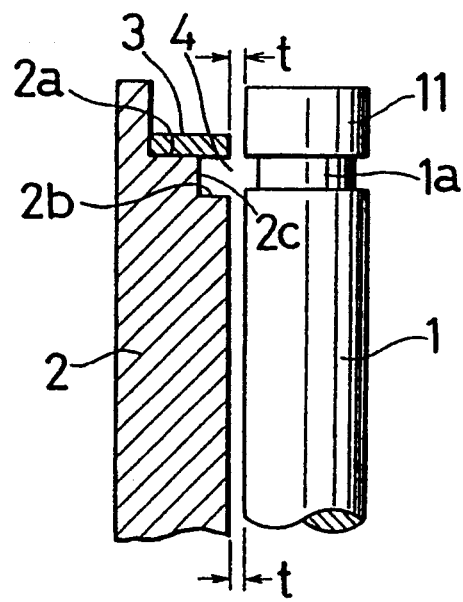
FIG. 1 is a cross-sectional view of the hydrodynamic bearing device according to a first embodiment of the invention.

Referring now to the accompanying drawings, concrete embodiments of the invention are described below. FIG. 1 is a cross-sectional view of the improved hydrodynamic bearing device according to the first embodiment of the invention. A shaft 1 making up part of a rotor and a stator is disposed coaxially with a sleeve 2 with a minimal clearance "t" between them that is filled with lubricant. Either the shaft 1 or the sleeve 2 is rotated at a very fast speed. A herringbone-type dynamic-pressure groove is formed on the surface of the shaft 1 or the sleeve 2.

A circumferential groove 1a is formed at one end of the shaft 1. A shaft-end member 11 having a diameter identical to that end of the shaft 1 makes up the exterior of the shaft beyond the circumferential groove 1a. A large diametric annular step 2a is formed at the end of the sleeve 2 and outside of the bearing unit. A small diametric annular step 2b is formed with the large diametric annular step 2a extending further into the interior of the bearing from the annular step 2a. An annular sealing plate 3 is coupled with the annular step 2a outside of the bearing.

A labyrinth is formed by means of the clearance between the annular sealing plate 3 and the shaft-end member 11, where the clearance is substantially identical to the clearance "t" inside of the bearing body.

An annular recessed domain 2c defined by the small-diametric annular step 2b is formed substantially opposite the circumferential groove 1a on the inner-diametric side of the sleeve 2.

As described earlier, the improved hydrodynamic bearing device offered by the invention is provided with the oil-pooling space 4 at the ends of the shaft 1 and the sleeve 2 by means of the shaft 1, the circumferential groove 1a, the sleeve 2, the sealing plate 3, and the annular recessed domain 2c. Therefore, even when the internal lubricant leaks from the interior of the bearing body, the leaking lubricant is securely held in the oil-pooling space 4 without leaking out of the hydrodynamic bearing device. Furthermore, even when foreign matter infiltrates into the bearing body, this is securely held in the oil-pooling space 4 without being permitted to infiltrate further into the bearing.

Figure 2A:
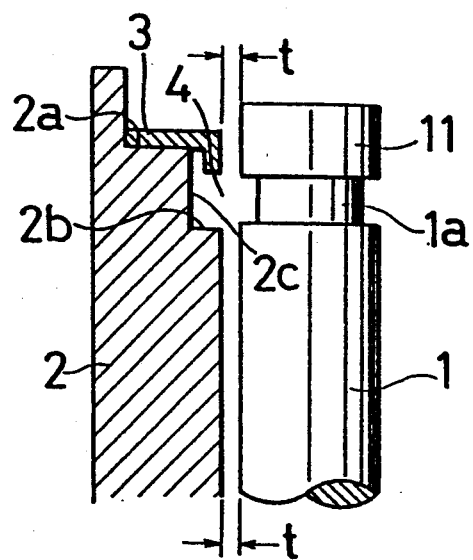
Figure 2B:
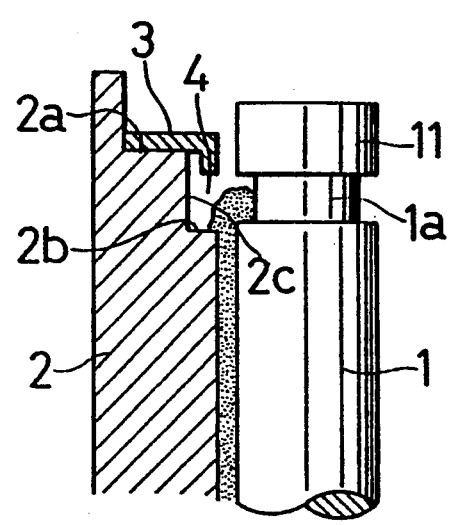

FIG. 2 is a cross-sectional view of the hydrodynamic bearing device according to a second embodiment of the invention. As shown in FIG. 2A, an inner-diametric end of a sealing plate 3 is folded inwardly direction relative to the shaft 1 in order to form labyrinth, where the sealing plate 3 is coupled with a large-diametric step 2a of the sleeve 2 and coaxial with the shaft 1. Concretely, the improved hydrodynamic bearing device according to the second embodiment of the invention forms the oil-pooling space 4 by means of the shaft 1, a circumferential groove 1a of the shaft 1, an annular step 2a of the sleeve 2, the edge-folded sealing plate 3, and an annular recessed domain 2c. By providing the bearing domain with the labyrinth structure, as shown in FIG. 2B, even when the whole of the hydrodynamic bearing device declines causing internal lubricant to leak from the interior of the bearing, lubricant is securely held in the oil-pooling space 4 without leaking out. Furthermore, even when foreign matter infiltrates into the bearing body, it is securely held in the oil-pooling space 4 without being permitted to infiltrate further into the bearing.

Figure 3:
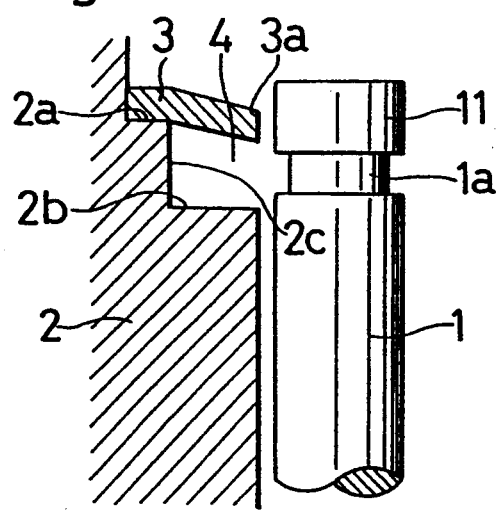
FIG. 3 is a cross-sectional view of the hydrodynamic bearing device according to a third embodiment of the invention.

FIG. 3 is a cross-sectional view of the improved hydrodynamic bearing device according a third embodiment of the invention. In the third embodiment, a sealing plate 3 is coupled with a large-diametric step 2a of the sleeve 2 that is coaxially disposed with the shaft 1. The inner diametric domain of the sealing plate 3 is folded in at a slight incline in the axial direction. Concretely, the hydrodynamic bearing device of the third embodiment of the invention is provided with the oil-pooling space 4 at an end of the bearing body by means of the shaft 1, a circumferential groove 1a of the shaft 1, an inclined domain 3a of the sealing plate 3 which is coupled with the sleeve 2, and an annular recessed domain 2c. As a result of the formation of the oil-pooling space 4 in the hydrodynamic bearing device, even when the whole of the bearing device declines causing internal lubricant to leak out the interior of the bearing body, lubricant is securely held in the oil-pooling space 4 without leaking out. Further, even when foreign matter infiltrates into the bearing body, it is securely held in the oil-pooling space 4 without being permitted to infiltrate further into the bearing.

Figure 4:
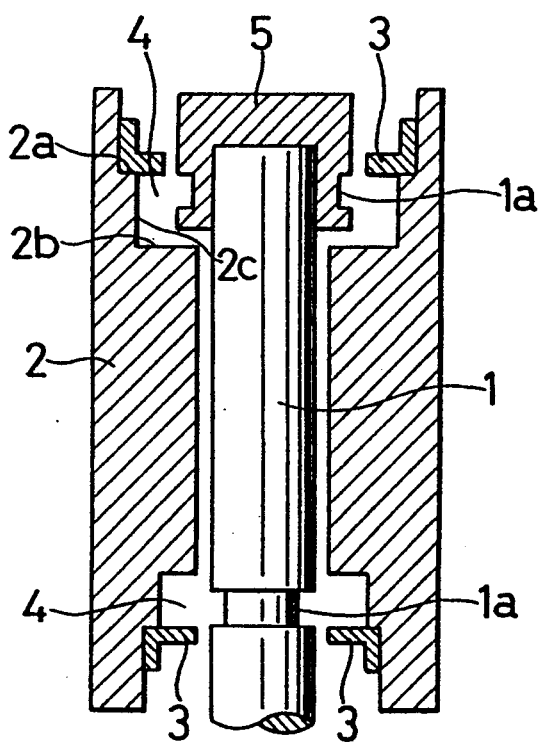
FIG. 4 is a cross-sectional view of the hydrodynamic bearing device according to a fourth embodiment of the invention.
Figure 5:
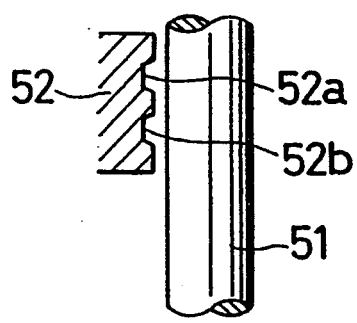
FIG. 5 is a cross-sectional view of a conventional hydrodynamic bearing device.
Figure 6:
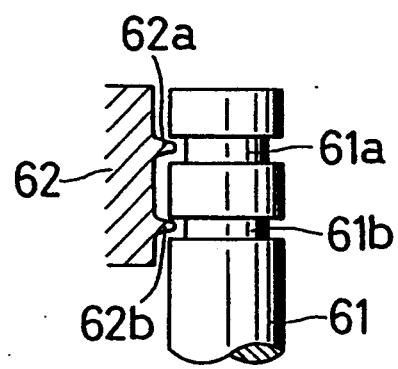
FIG. 6 is a cross-sectional view of another conventional hydrodynamic bearing device.

FIG. 4 is a cross-sectional view of the improved hydrodynamic bearing device according to a fourth embodiment of the invention. In the fourth embodiment, a cap 5 is coupled with a shaft 5. A circumferential groove 1a is formed in the cap 5. A sealing plate 3 that is L-shaped in cross-section (this is not compulsorily of the L-shape) is coupled with an upper step 2a formed on the sleeve 2. Concretely, the hydrodynamic bearing device according to the fourth embodiment forms the oil-pooling space 4 at an end of the bearing device by means of the circumferential groove 1a of the cap 5 coupled with the shaft 1, the sealing plate 3 coupled with the sleeve 2, the step 2b below the sleeve 2, and an annular recessed domain 2c. The lower domain of the hydrodynamic bearing device according to the fourth embodiment incorporates a labyrinth structure similar to that of the first embodiment shown in FIG. 1, but which a sealing plate 3 that is L-shaped and that performs an identical function.

According to the hydrodynamic bearing device of the fourth embodiment of the invention, even when the whole of the bearing device declines, the internal lubricant is securely held in the oil-pooling space 4 without leaking out. Furthermore, even when foreign matter infiltrates into the bearing body, it is securely held in the oil-pooling space 4 without being permitted to infiltrate further into the bearing.

Those structures of the improved hydrodynamic bearing device according to the above embodiments of the invention securely hold internal lubricant in the oil-pooling space 4 even when the bearing device declines causing lubricant to leak out from the interior of the bearing. As a result, even the slightest amount of lubricant cannot leak out. Furthermore, even when foreign matter infiltrates into the bearing body, it is securely held in the oil-pooling space 4 without being permitted to infiltrate further into the bearing.

The improved hydrodynamic bearing device according to the invention can be usefully utilized as a bearing unit for those fast-rotating component parts of electric equipment and/or electronic office apparatus. Even when the electric equipment or the electronic apparatus incorporating the improved hydrodynamic bearing device of the invention shift position causing the bearing device to decline, internal lubricant is prevented from leaking out of the bearing device. Further, foreign matter is preventing from infiltrating into the bearing device. Owing to its simplified structure and shape, the improved hydrodynamic bearing device can be easily assembled, thus advantageously lowering manufacturing costs.

What is claimed is:

1. A hydrodynamic bearing device, comprising:
   a shaft;
   a sleeve sealed internally with said shaft, said shaft and sleeve being rotatable relative to each other, wherein a dynamic pressure groove for generating dynamic pressure is defined on an external circumferential surface of said shaft or on an internal circumferential surface of said sleeve, a circumferential groove being defined at said shaft external to said bearing device and relative to said sleeve; and an annular sealing plate secured to said sleeve and inter-engaging with said shaft external to said bearing and said circumferential groove, wherein a labyrinth is defined between an inner-diametric domain of said sealing plate and said shaft, an annular recessed domain is defined on the internal circumferential surface of said sleeve and positioned substantially opposite said circumferential groove, and an oil-pooling space is defined between said shaft, said circumferential groove, said sleeve, said sealing plate, and said annular recessed domain.

2. A hydrodynamic bearing device as defined in claim 1, wherein said shaft includes a cylindrical member on said shaft external to said bearing device, wherein said circumferential groove is further defined by an external circumferential domain of said cylindrical member and said shaft external to said bearing device.

* * * * *